(12) United States Patent
Suzuki et al.

(10) Patent No.: US 8,201,578 B2
(45) Date of Patent: Jun. 19, 2012

(54) OIL PAN

(75) Inventors: Takenori Suzuki, Hamamatsu (JP); Yosuke Hio, Hamamatsu (JP)

(73) Assignee: Roki Co., Ltd., Shizuoka (JP)

( * ) Notice: Subject to any disclaimer, the term of this patent is extended or adjusted under 35 U.S.C. 154(b) by 532 days.

(21) Appl. No.: 12/500,260

(22) Filed: Jul. 9, 2009

(65) Prior Publication Data
US 2010/0018589 A1    Jan. 28, 2010

(30) Foreign Application Priority Data
Jul. 24, 2008 (JP) ................................. 2008-190795

(51) Int. Cl.
*F16K 51/00* (2006.01)
(52) U.S. Cl. ........................................ 137/590; 184/1.5
(58) Field of Classification Search .................. 137/590; 184/1.5, 105.3; 222/546
See application file for complete search history.

(56) References Cited

U.S. PATENT DOCUMENTS

| | | | | |
|---|---|---|---|---|
| 4,470,577 A | * | 9/1984 | Warwick ........................ | 251/217 |
| 4,807,847 A | * | 2/1989 | Martz ............................ | 251/144 |
| 4,940,209 A | * | 7/1990 | Fish .............................. | 251/144 |
| 5,048,578 A | * | 9/1991 | Dorf et al. ..................... | 141/346 |
| 5,057,249 A | * | 10/1991 | Baltz et al. .................... | 261/72.1 |
| 5,168,844 A | * | 12/1992 | Waelput ........................ | 123/196 A |
| 2005/0098384 A1 | * | 5/2005 | Chang .......................... | 184/1.5 |

FOREIGN PATENT DOCUMENTS

JP     2008-025784 A     2/2008

* cited by examiner

*Primary Examiner* — John Fox
(74) *Attorney, Agent, or Firm* — Sughrue Mion, PLLC

(57) ABSTRACT

An oil pan includes a bottom portion, a side wall portion standing upward form an edge portion of the bottom portion, a cylindrical lubricating oil amount adjusting wall structure standing upward from substantially the central portion of the bottom portion and formed, to an inner peripheral portion thereof, with a lubricating oil amount adjusting passage which communicates with an external portion, the lubricating oil amount adjusting wall having a lubricating oil drain port formed to a lower portion thereof, a cylindrical lubricating oil adjusting plug assembled detachably to the lubricating oil amount adjusting passage so that the lubricating oil adjusting plug closes the lubricating oil drain port, the lubricating oil amount adjusting plug being formed with a communication port communicating with the lubricating oil amount adjusting passage, and a drain plug fitted detachably to the communication port.

8 Claims, 2 Drawing Sheets

OIL PAN

CROSS-REFERENCE TO RELATED APPLICATIONS

This application is based upon and claims the benefit of priority from Japanese Patent Application No. 2008-190795 filed on Jul. 24, 2008; the entire contents of which are incorporated herein by reference.

BACKGROUND OF THE INVENTION

1. Field of the Invention

The present invention relates to an oil pan to be attached to a lower end portion of a machine or like, and more particularly, to an oil pan having an adjusting mechanism for adjusting an oil amount to be sealed in an automatic speed change gear (transmission, called hereinafter) or like.

2. Description of Related Art

In conventional technology, it is known that lubricating oil is sealed in an automatic transmission of an automobile, for example, in which gears or like members for transmitting power is housed for the purposes of realizing smooth driving of gears or like and effectively cooling friction heat generated by the driving of the gear.

As mentioned above, in order to realize the smooth driving of the gear or like and maintain performance for effective cooling of the friction heat, it is necessary to periodically change the lubricating oil and also necessary to maintain sealed amount of the lubricating oil sealed in the automatic transmission. Then, in conventional technology, there has been known a mechanism for adjusting the sealed amount of the lubricating oil sealed in the automatic transmission of an automobile, for example.

Such a conventional sealed lubricating oil amount adjusting mechanism is provided, in order to completely discharge the sealed lubricating oil, with a lubricating oil discharge port formed to the lowest end portion of an oil and a lubricating oil adjusting port for discharging the lubricating oil of an amount more than a predetermined amount of lubricating oil through a tubular-shaped lubricating oil adjusting cylinder. According to this lubricating oil adjusting mechanism, when it is required to exchange the lubricating oil, the exchanging working was performed by the steps of removing a bolt closing the lubricating oil discharge port to thereby discharge whole the amount of the lubricating oil in the automatic transmission, to charge new lubricating oil into the automatic transmission, after closing the lubricating oil discharge port, till the charged lubricating oil overflows the lubricating oil amount adjusting port, and then, closing the lubricating oil amount adjusting port by means of bolt, thus performing the oil exchanging working.

As mentioned above, by forming the lubricating oil amount adjusting cylinder to the oil pan, the sealed amount of oil (or amount of oil to be sealed) in the automatic transmission can be suppressed to an amount less than the predetermined amount, and hence, the amount of oil to be sealed can be precisely adjusted.

However, according to the lubricating oil sealed amount adjusting mechanism of the structure mentioned above, it is necessary to mount or dismount the bolts for closing the lubricating oil discharge port and the lubricating oil amount adjusting port, which may involve complicated working, and in addition, it is necessary to form the lubricating oil discharge port and the lubricating oil amount adjusting port to the oil pan, which may constitute a bar for providing compact structure of the oil pan, and hence, of the automatic transmission, thus providing inconvenience.

In consideration of the above matters encountered in the conventional technology, a lubricating oil sealed amount adjusting mechanism disclosed in Patent Publication 1 (Japanese Patent Application Laid-open Publication No. 2008-25784) is provided with an overflow plug which is detachably mounted to the lubricating oil discharge port. According to this lubricating oil sealed amount adjusting mechanism, when it is required to exchange the lubricating oil, the overflow plug and a bolt closing the lubricating oil discharge port are both removed, and the lubricating oil sealing the automatic transmission is discharged. Thereafter, only the overflow plug is mounted to the lubricating oil discharge port, and the lubricating oil is then supplied. Accordingly, the lubricating oil of the amount more than the predetermined amount can be discharged, thereby adjusting the amount of the lubricating oil to be sealed.

According to the lubricating oil sealed amount adjusting mechanism of the structure mentioned above, the oil exchanging working can be done easily and effectively, thus making compact the structure of the oil pan.

However, according to the lubricating oil sealed amount adjusting mechanism disclosed in the Patent Publication 1, in spite of the above technical merit, it is necessary to mount or dismount the overflow bolt every time of exchanging the lubricating oil, and therefore, it is difficult to keep constant the height level of the front end portion of the overflow plug every time of mounting or dismounting the overflow plug, leading to difficulty of precisely adjusting the amount of the lubricating oil to be sealed. In case of less or much amount of the lubricating oil to be sealed, it becomes impossible to keep constant resistance to be applied to mechanical parts or components such as gears constituting the automatic transmission, and hence, it is difficult to maintain essential performance of the lubricating oil for realizing the smooth driving of the gears or like and effectively cooling the friction heat.

SUMMARY OF THE INVENTION

The present invention was conceived in consideration of the circumstances encountered in the prior art mentioned above and an object thereof is to provide an oil pan having a structure capable of precisely adjusting discharge of lubricating oil and also adjusting amount thereof to be sealed by utilizing one lubricating oil discharge port.

The above and other objects can be achieved according to the present invention by providing an oil pan having a structure for adjusting drain amount and seal amount of lubricating oil to be sealed in the oil pan, comprising:

a bottom portion;

a side wall portion standing upward form an edge portion of the bottom portion;

a cylindrical lubricating oil amount adjusting wall structure standing from substantially a central portion of the bottom portion and formed, to an inner peripheral portion thereof, with a lubricating oil amount adjusting passage which communicates with an external portion, the lubricating oil amount adjusting wall structure having a lubricating oil drain port formed to a lower portion thereof;

a cylindrical lubricating oil adjusting plug assembled detachably to the lubricating oil amount adjusting passage so that the lubricating oil adjusting plug closes the lubricating oil drain port, and the lubricating oil amount adjusting plug being formed with a communication port communicating with the lubricating oil amount adjusting passage; and a drain plug fitted detachably to the communication port.

In a preferred embodiment, the lubricating oil amount adjusting passage, the lubricating oil amount adjusting plug and the drain plug may be assembled coaxially with each other.

The lubricating oil amount adjusting plug is provided with a first seal structure such as O-ring.

The drain plug is provided with a second seal structure such as O-ring.

It may be desired that the oil pan is formed of a resin material.

The lubricating oil amount adjusting plug and the drain plug may be detachably screw-engaged with the lubricating oil amount adjusting passage and the communication port, respectively.

According to the oil pan according to the present invention of the structure mentioned above, the oil pan is provided with the cylindrical lubricating oil amount adjusting wall structure which stands upward from the bottom portion of the oil pan and has the inner peripheral portion to which the lubricating oil amount adjusting passage is formed so as to communicate with the external portion of the oil pan. This lubricating oil amount adjusting wall structure is formed, at its lower portion, with the lubricating oil discharge port, and to the lubricating oil amount adjusting passage, is fitted, to be detachable, the cylindrical lubricating oil amount adjusting plug which closes the lubricating oil discharge port and is formed with the communication port communicating with the lubricating oil amount adjusting passage. The communication port is closed by the detachable drain plug. Accordingly, the lubricating oil in the oil pan can be drained from the lubricating oil amount adjusting passage through the lubricating oil drain port by removing the lubricating oil amount adjusting plug and the drain plug, and on the other hand, by assembling the lubricating oil amount adjusting plug and closing only the lubricating oil drain port, the lubricating oil of the amount more than the predetermined amount prescribed by the lubricating oil amount adjusting wall structure is drained through the lubricating oil amount adjusting passage, thus adjusting the lubricating oil amount to be sealed in the oil pan.

Furthermore, since the lubricating oil amount adjusting wall structure is formed so as to stand upward from substantially the central portion of the bottom portion of the oil pan, it is not necessary to change the height every time of exchanging the lubricating oil and the predetermined amount the lubricating oil can be always constantly prescribed.

Still furthermore, in the oil pan of the present invention, since the lubricating oil amount adjusting plug and the drain plug are assembled coaxially with each other, the structure of the oil pan can be made compact.

Still furthermore, since the oil pan of the present invention is provided with the first seal means such as O-ring and the second seal means such as O-ring to the lubricating oil adjusting plug and the drain plug, respectively, the sealing structures for the lubricating oil amount adjusting passage and the lubricating oil drain port can be easily constructed.

Still furthermore, since the oil pan is formed of a resin material, it can be easily molded with cheap manufacturing cost.

The nature and further characteristic feature of the present invention will be made clearer from the following descriptions made with reference to the accompanying drawings.

DESCRIPTION OF THE PREFERRED EMBODIMENT

Hereunder, a preferred embodiment of the present invention will be described with reference to the accompanying drawings, and it is further to be noted that a preferred embodiment which is to be described hereunder is not limited to the invention of the respective claims, and it is also not limited to that in which all the combination of subject features of the embodiment described in the specification is essential to the solution of the invention. Furthermore, it is also to be noted that, in the followings, although the description of the embodiment is limited to a lubricating oil amount adjusting mechanism of an oil pan applied to an automatic transmission (speed change gear) of an automobile, the present invention is not limited to the automatic transmission and is applicable to tanks or like for which adjustment of an amount of a lubricating oil to be sealed therein is required.

Figure 1:
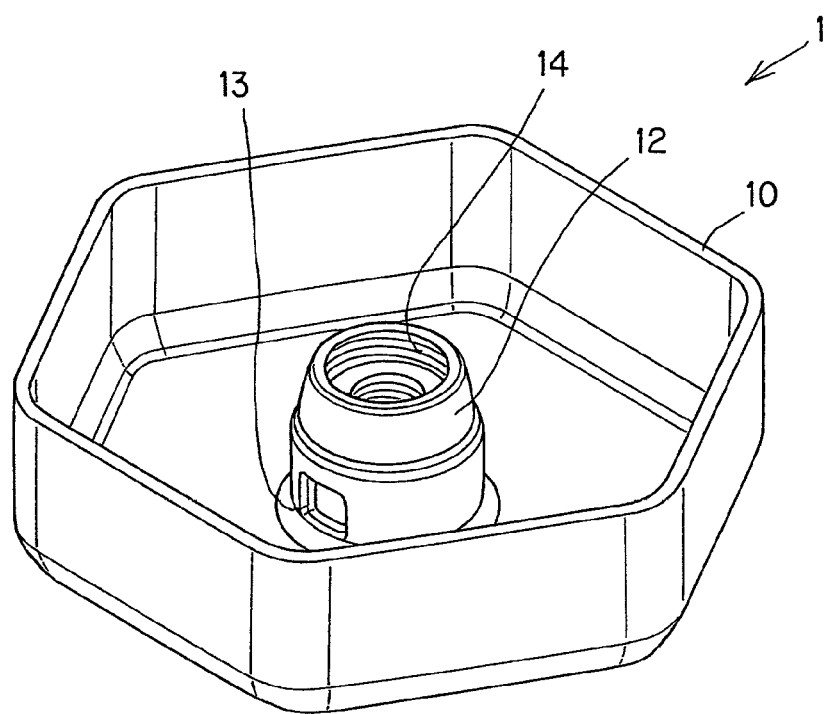
FIG. 1 is a perspective view of an oil pan according to the present invention showing an inside structure thereof.
Figure 2:
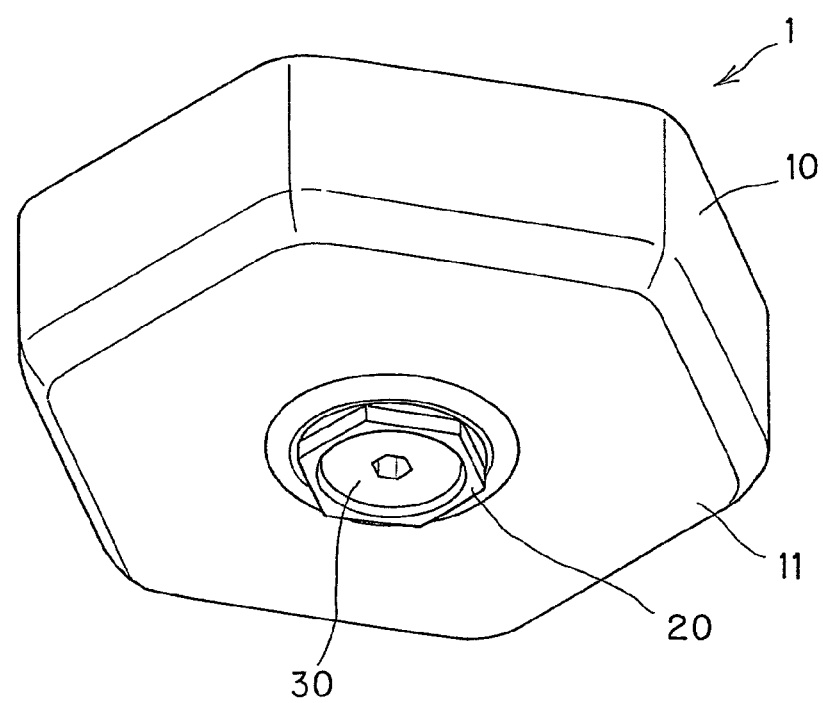
FIG. 2 is a perspective view of the oil pan of FIG. 1 showing a back side thereof.
Figure 4:
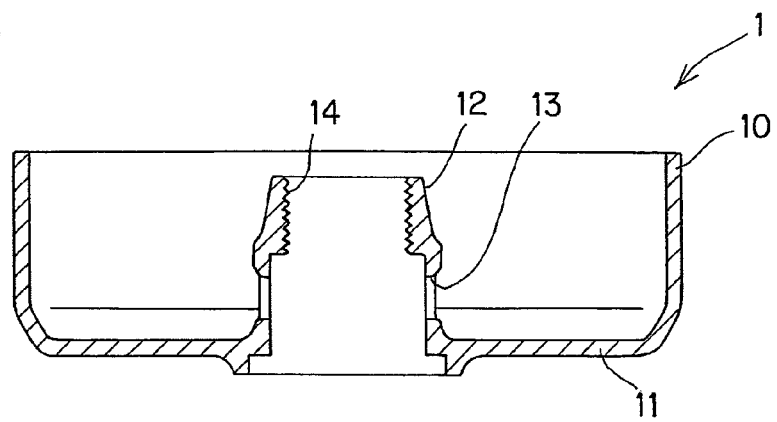
FIG. 4 is a cross sectional view of the oil pan of FIG. 1 showing a lubricating oil discharging state.

With reference to FIGS. 1 and 4, particularly, FIGS. 1 and 2, an oil pan 1 of the present embodiment is formed of resin material, and the oil pan has a hexagonal bottomed cylindrical shape in an outer appearance having side wall sections 10 standing upward from an end edge of a bottom portion 11. At substantially a central portion of the bottom portion 11, a cylindrical lubricating oil amount adjusting wall (wall structure) 12 is provided so as to stand upward from the bottom portion 11, and a lubricating oil amount adjusting passage 14 is formed to an inner peripheral portion of the lubricating oil amount adjusting wall 12 so as to communicate with an outside of the oil pan (the lubricating oil amount adjusting passage 14 is defined by the structure of the cylindrical oil amount adjusting wall 12). A lubricating oil discharge port 13 is formed below the lubricating oil amount adjusting wall 12 so as to communicate the lubricating oil amount adjusting passage 14 with the interior of the oil pan 11.

Figure 3:
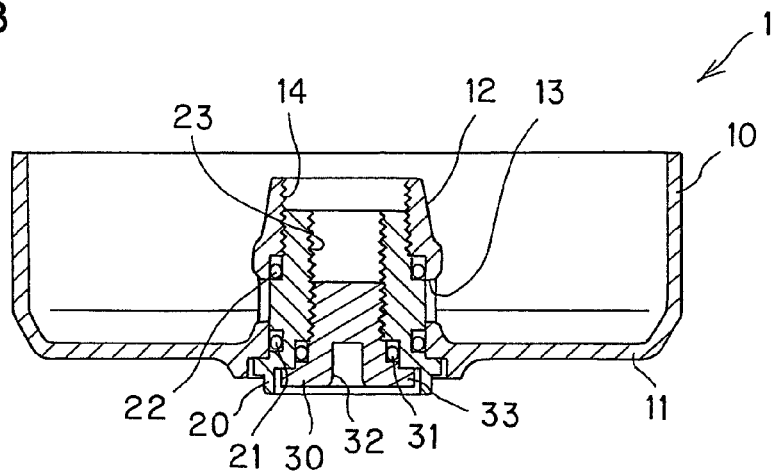
FIG. 3 is a cross sectional view of the oil pan of FIG. 1.

As shown in FIG. 3, the lubricating oil amount adjusting passage 14 is closed by a lubricating oil amount adjusting plug 20 and a drain plug 30 which are assembled coaxially. The lubricating oil amount adjusting plug 20 is assembled with the lubricating oil amount adjusting passage 14 through screw engagement with thread formed to the lubricating oil amount adjusting passage 14, and the drain plug 30 is also assembled with the lubricating oil amount adjusting plug 20 through screw engagement with thread formed to a communication hole 23 formed in the axial direction of the lubricating oil amount adjusting plug 20.

The lubricating oil amount adjusting plug 20 has a nut-shaped hexagonal bottom end edge portion in an outer appearance, and the lubricating oil amount adjusting plug 20 can be easily screw-engaged with or disengaged from the lubricating oil amount adjusting passage 14 by using a tool such as spanner suitably engaged with such nut-shape. On the other hand, the drain plug 30 is formed with a hexagonal hole 32 at a central portion thereof, and the drain plug 30 can be easily screw engaged with or disengaged from the lubricating oil amount adjusting plug 20 by using a tool such as hexagonal wrench suitably fitted to the hexagonal hole 32.

The lubricating oil amount adjusting plug 20 has a cylindrical structure formed with a communication hole 23 to an inner peripheral surface thereof. Furthermore, O-ring grooves are formed to an outer peripheral surface of the lubricating oil amount adjusting plug 2, and first O-rings 21 and 22 as first seal means are fitted to these O-ring grooves, respectively. The first O-rings 21 and 22 are formed at positions suitable for sealing upper and lower portions of the lubricating oil discharge port 13 formed to the lubricating oil amount adjusting wall 12 when the lubricating oil amount adjusting plug 20 is fitted to the lubricating oil amount adjusting passage 14, thus constituting the sealing structure for closing the lubricating oil discharge port 13 when the lubricating oil amount adjusting plug 20 is fitted to the lubricating oil amount adjusting passage 14.

Incidentally, the drain plug 30 has a solid cylindrical structure having a flanged portion formed at a lower end portion thereof, and to this drain plug 30, there is fitted a second O-ring 31 as second sealing means. This second O-ring 31 constitutes a sealing structure for closing the communication hole 23 when the drain plug 30 is engaged with the lubricating oil amount adjusting plug 20.

Figure 5:
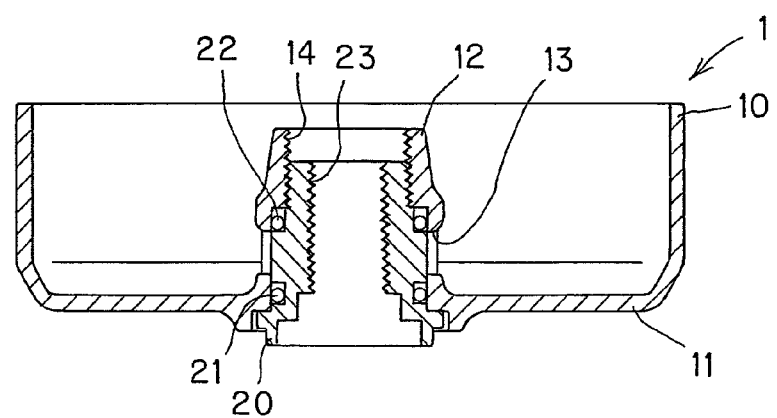
FIG. 5 is a cross sectional view of the oil pan of FIG. 1 showing a lubricating oil amount adjusting state.

Hereunder, a method of adjusting the discharge amount of sealing amount of the lubricating oil sealed in the automatic transmission with reference to FIGS. 4 and 5.

First, as shown in FIG. 4, when the lubricating oil sealed in the automatic transmission is discharged, the lubricating oil amount adjusting plug 20 and the drain plug 30 are disengaged and removed to release the lubricating oil discharge port 13. In this operation, since the lubricating oil sealed in the automatic transmission is not sealed at a height level less than the predetermined height of the lubricating oil amount adjusting wall 12 by the adjustment of the sealed lubricating oil amount, when the lubricating oil amount adjusting plug 20 and the drain plug 30 are removed, the lubricating oil is discharged outward from the lubricating oil amount adjusting passage 14 through the released lubricating oil discharge port 13.

Next, FIG. 5 shows a state in which only the lubricating oil amount adjusting plug 20 is fitted to the lubricating oil amount adjusting passage 14. According to the fitting of only the lubricating oil amount adjusting plug 20 to the lubricating oil amount adjusting passage 14, only the lubricating oil discharge port 13 can be closed while maintaining the communication of the lubricating oil amount adjusting passage 14 with the external side through the communication hole 23.

Under this state, when the lubricating oil is newly supplied to the automatic transmission, the lubricating oil supplied to a height level more than the height of the lubricating oil amount adjusting wall 12 is discharged externally through the lubricating oil amount adjusting passage 14. Accordingly, by supplying the new lubricating oil to the automatic transmission till the lubricating oil is discharged from the lubricating oil amount adjusting passage 14, a desired amount of the lubricating oil can be charged into the automatic transmission, thus precisely adjusting the amount of the lubricating oil to be sealed.

Further, the lubricating oil amount adjusting wall 12 stands upward from substantially the central portion of the bottom portion 11 of the oil pan 1, and accordingly, the desired amount of the lubricating oil to be sealed can be kept always constantly without changing the height thereof.

As described above, after the precise adjustment of the amount of the lubricating oil to be sealed, the drain plug 30 is fitted to the communication hole 23, thereby closing the lubricating oil amount adjusting passage 14 and the communication hole 23, and hence, sealing the desired amount of the lubricating oil in the automatic transmission.

As described hereinbefore, the oil pan 1 of the present embodiment is provided with the cylindrical lubricating oil amount adjusting wall 12 which stands from the bottom surface of the oil pan 1 and has the inner peripheral portion to which the lubricating oil amount adjusting passage 14 is formed so as to communicate with the external portion of the oil pan 1. This lubricating oil amount adjusting wall 12 is formed, at its lower portion, with the lubricating oil discharge port 13, and to the lubricating oil amount adjusting passage 14, is fitted, to be detachable, the cylindrical lubricating oil amount adjusting plug 20 which closes the lubricating oil discharge port 13 and is formed with the communication port 23 communicating with the lubricating oil amount adjusting passage 14. The communication port 23 is closed by the detachable drain plug 30. Accordingly, the lubricating oil in the oil pan 1 can be drained from the lubricating oil amount adjusting passage 14 through the lubricating oil drain port 13 by removing the lubricating oil amount adjusting plug 20 and the drain plug 30, and on the other hand, by mounting the lubricating oil amount adjusting plug 20 and closing only the lubricating oil drain port 13, the lubricating oil of the amount more than the predetermined amount prescribed by the lubricating oil amount adjusting wall 12 is drained through the lubricating oil amount adjusting passage 14, thus adjusting the lubricating oil amount to be sealed in the oil pan 1. Furthermore, since the lubricating oil amount adjusting wall 12 is formed so as to stand upward from the bottom surface 11 of the oil pan 1, it is not necessary to change the height every time of exchanging the lubricating oil and the predetermined amount the lubricating oil can be always constantly prescribed.

Furthermore, in the oil pan 1 of the present embodiment, since the lubricating oil amount adjusting plug 20 and the drain plug 30 are assembled coaxially with each other at substantially the central portion of the oil pan bottom portion, the structure of the oil pan can be made compact.

Still furthermore, since the oil pan 1 of the present embodiment is provided with the first seal means such as O-rings 21, 22 and the second seal means such as O-ring 31 to the lubricating oil adjusting plug 20 and the drain plug 30, respectively, the sealing structures for the lubricating oil amount adjusting passage 14 and the lubricating oil drain port 13 can be easily constructed.

Still furthermore, since the oil pan 1 of the present embodiment is formed of a resin material, it can be easily molded with cheap manufacturing cost.

Hereinabove, although the preferred embodiment of the present invention was described, the present invention is not limited to the described technical range or scope. For example, the oil pan may be formed of metal such as aluminium as in the conventional technology.

Furthermore, in the above embodiment, although the oil pan has a hexagonal shape, the shape thereof is not limited such hexagonal shape and other shapes may be adopted in conformity with a shape of a used automatic transmitter.

Still furthermore, in the above embodiment, although the lubricating oil adjusting plug and the drain plug are assembled through the screw engagement, protrusion/recess engagement, clip engagement, or other assembling means may be adopted.

It is further to be noted that many other changes and modifications may be made without departing from the technical range of the present invention, which is apparent from the scopes of the appended claims.

What is claimed is:

1. An oil pan having a structure for adjusting drain amount and seal amount of lubricating oil to be sealed in the oil pan, comprising:
   a bottom portion;
   a side wall portion standing upward form an edge portion of the bottom portion;
   a cylindrical lubricating oil amount adjusting wall structure standing upward from substantially a central portion of the bottom portion and formed, to an inner peripheral portion thereof, with a lubricating oil amount adjusting passage which communicates with an external portion, the lubricating oil amount adjusting wall structure having a lubricating oil drain port formed to a lower portion thereof;
   a cylindrical lubricating oil adjusting plug assembled detachably to the lubricating oil amount adjusting passage so that the lubricating oil adjusting plug closes the lubricating oil drain port, and the lubricating oil amount adjusting plug being formed with a communication port communicating with the lubricating oil amount adjusting passage; and
   a drain plug fitted detachably to the communication port of the lubricating oil amount adjusting plug.

2. The oil pan according to claim 1, wherein the lubricating oil amount adjusting passage, the lubricating oil amount adjusting plug and the drain plug are assembled coaxially with each other.

3. The oil pan according to claim 1, wherein the lubricating oil amount adjusting plug is provided with a first seal structure.

4. The oil pan according to claim 3, wherein the first seal structure is an O-ring.

5. The oil pan according to claim 1, wherein the drain plug is provided with a second seal structure.

6. The oil pan according to claim 5, wherein the second seal structure is an O-ring.

7. The oil pan according to claim 1, wherein the oil pan is formed of a resin material.

8. The oil pan according to claim 1, wherein the lubricating oil amount adjusting plug and the drain plug are detachably screw-engaged with the lubricating oil amount adjusting passage and the communication port, respectively.

* * * * *